United States Patent

[11] 3,569,672

[72] Inventor Bohdan Hurko
 Louisville, Ky.
[21] Appl. No. 820,904
[22] Filed May 1, 1969
[45] Patented Mar. 9, 1971
[73] Assignee General Electric Company

[54] LOW THERMAL MASS, PLATE SURFACE HEATING UNIT
 14 Claims, 8 Drawing Figs.
[52] U.S. Cl. ............................................. 219/464,
 126/400, 219/457, 219/461, 219/462, 219/463,
 219/530
[51] Int. Cl. ............................................ H05b 3/68
[50] Field of Search............................... 219/461,
 463, 464, 465—7, 438—6, 530, 540; 126/390,
 215; 148/12; 219/196.1

[56] References Cited
UNITED STATES PATENTS

| | | | |
|---|---|---|---|
| 1,998,764 | 4/1935 | Fordan et al. | 219/457 |
| 2,400,508 | 5/1946 | Hermann | 126/215 |
| 2,691,717 | 10/1954 | Huck | 219/462 |
| 2,727,133 | 12/1955 | Scofield | 219/463 |
| 2,841,137 | 7/1958 | Chace | 126/390 |
| 3,095,498 | 6/1963 | Foster | 219/441 |
| 3,196,253 | 7/1965 | Jepson et al. | 219/436 |
| 3,445,630 | 5/1969 | Ulam | 219/438 |
| 3,446,392 | 5/1969 | Lescure | 126/390X |

Primary Examiner—Mayewski, Volodymyr Y. and Harold Broome
Attorneys—Richard L. Caslin, Harry F. Manbeck, Jr., Joseph B. Forman, Oscar B. Waddell and Frank L. Neuhauser ABSTRACT: A light weight solid plate surface heating unit of low thermal mass having a top plate of high thermal conductive material for distributing the heat rapidly and uniformly over the plate. The top plate is of composite sheet material with a center core selected from the group of high thermal conductivity materials such as copper, silver and aluminum, and an outer skin selected from the group of corrosion and oxidation resisting materials such as stainless steel, nickel and chromium. There is a heating means for the plate in the form of a metal sheathed electrical resistance heating element of coiled configuration adapted to be held against the underside of the plate. It is important that the top plate remain as flat as possible at all times so as to reduce the formation of gaps between the surface of the top plate and the bottom surface of cooking utensils carried thereon. Reinforcing means are provided for the top plate to prevent warpage due to thermal stresses. A thermal reflecting member is positioned beneath the heating unit to redirect the heat in an upward direction. The heating unit may be held in an opening in the cooktop by providing an adjustable tension member joining the reinforcing member of the heating unit with the reflecting member such that the edge of the opening in the cooktop is clamped by the interaction of the top plate and the reflecting member.

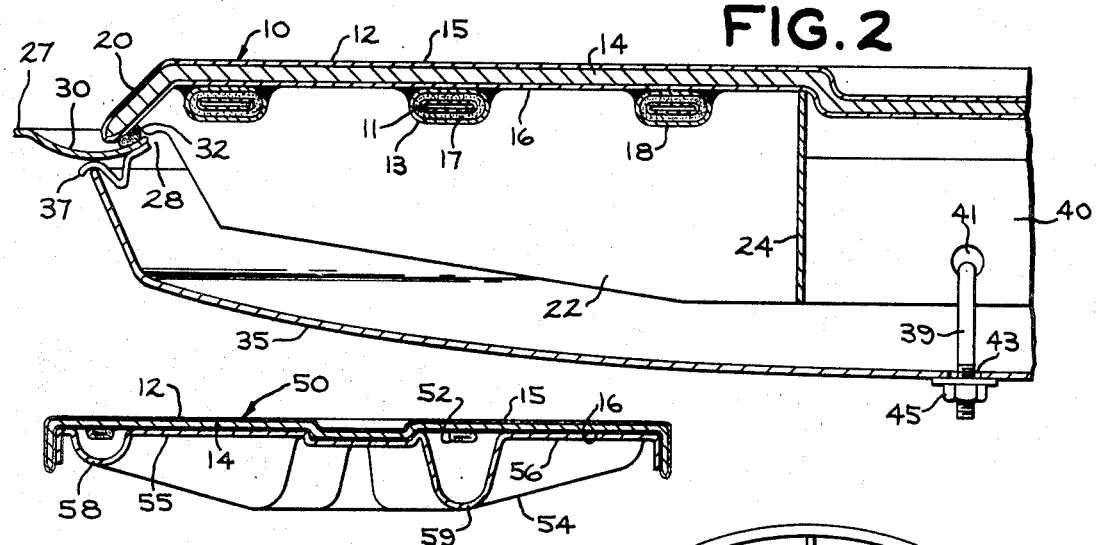
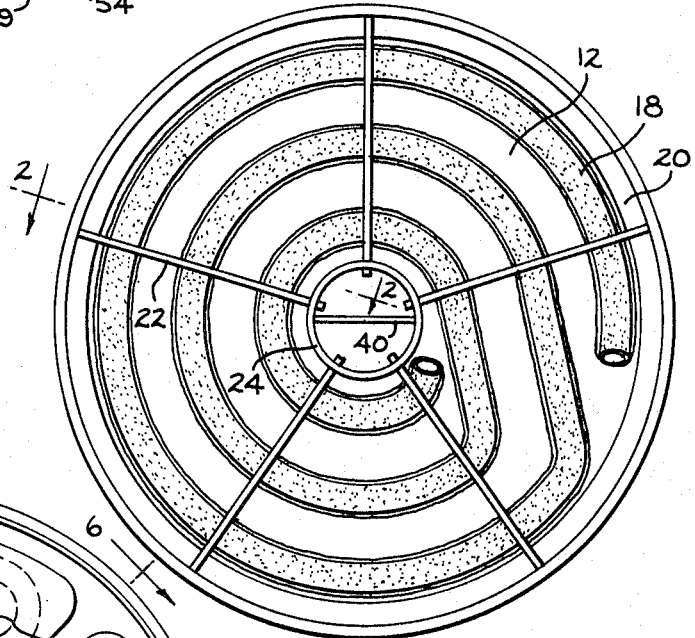
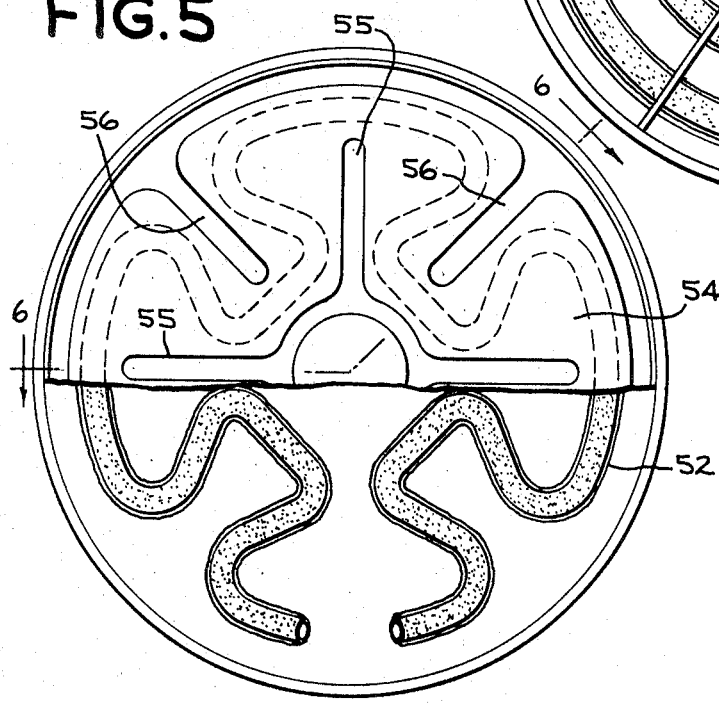

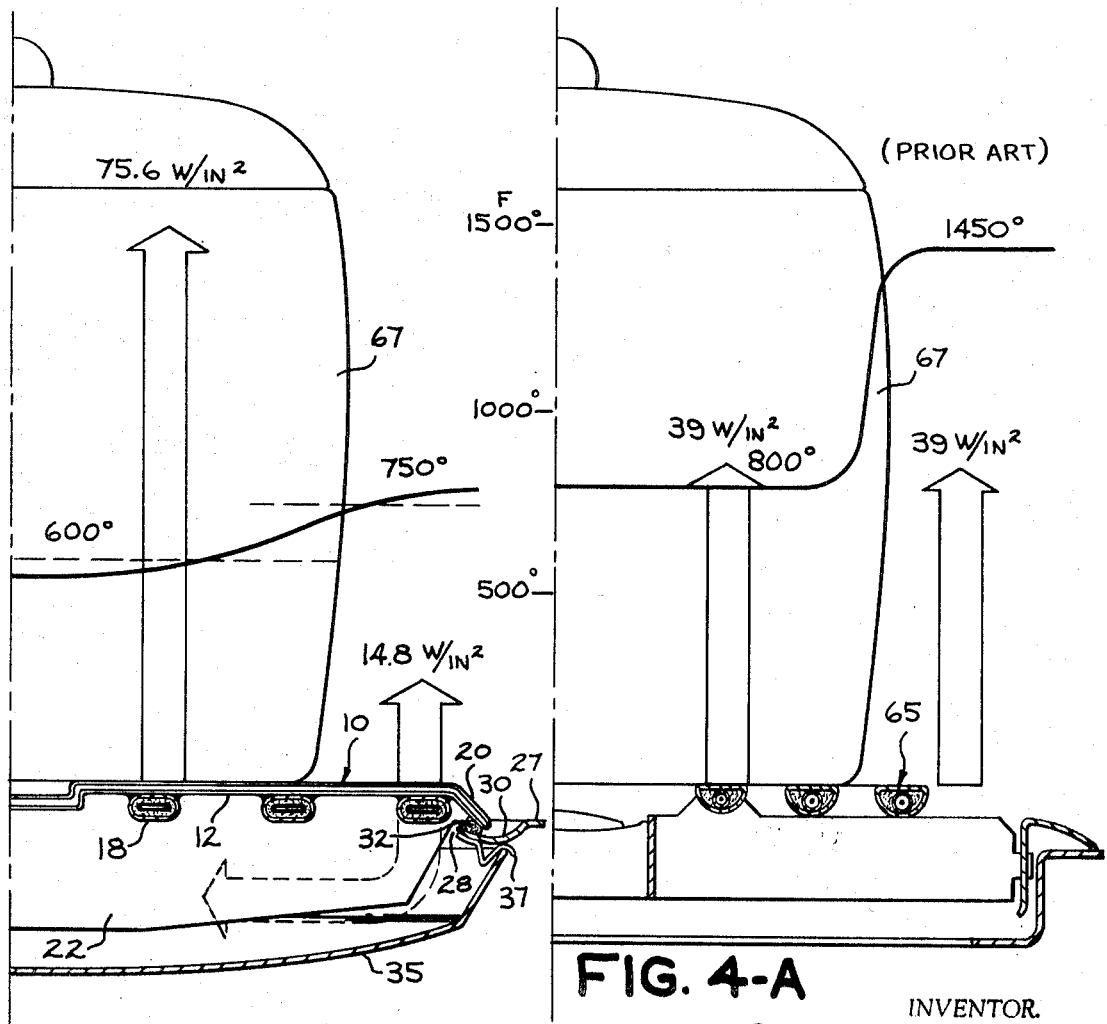

LOW THERMAL MASS, PLATE SURFACE HEATING UNIT

BACKGROUND OF THE INVENTION

The average housewife today has become less interested in spending a great deal of her time housecleaning, as there are so many more challenging opportunities for an intelligent person to occupy her time outside the home for instance in civic, social or career work. Hence, there is an ever increasing interest in obtaining modern household conveniences for simplifying the housecleaning chores. Particular reference is made here to domestic ranges. As to the ease of cleaning the oven of a range, there has been widespread acceptance of the pyrolytic, self-cleaning oven such as is taught in U.S. Pat. No. 3,121,158 of Bohdan Hurko, the present inventor. The simple solution of the age-old problem of maintaining a sparkling clean oven has turned the attention of the housewife to the ease of cleaning the cooktop.

A standard electric cooktop is usually provided with a plurality of metal sheathed electrical resistance heating elements which are each wound in a spiral coil and positioned in an opening formed in the cooktop. Each heating element is adapted to support a cooking utensil thereon. These metal sheathed heating elements are self-cleaned of food soil due to the high temperatures of about 1200° F. they are permitted to reach once they are energized, but it is possible for spillovers to drain through the heating element and accumulate in a collecting pan located beneath the cooktop.

Solid plate surface heating units have been developed prior to this time but they have not gained general acceptance in this country, because as a general rule they were of heavy cast construction having a relatively high thermal mass which renders them slow to heat up and slow to cool down as compared with the widely used metal sheathed heating elements.

The principal object of the present invention is to provide a low thermal mass, solid plate surface heating unit where the plate is made of a high thermal conductive material for obtaining uniform temperature distribution, where the rate of heat-up and cool-down is equal to or better than the results obtained of a metal sheathed electrical resistance heating element.

A further object of the present invention is to provide a solid plate surface heating unit of low thermal mass by using a top plate of composite sheet material that has a high thermal conductivity on the order of copper yet is strong and resistant to corrosion and oxidation.

A further object of the present invention is to provide a solid plate surface heating unit of the class described with the provision of a durable, long life heating means in the form of a metal sheathed resistance heating element of about half the size of a standard metal sheathed unit of comparable wattage.

A further object of the present invention is to provide a solid plate surface heating unit of the class described with a reinforcing means to insure against warpage of the top plate.

A still further object of the present invention is to provide a solid plate surface heating unit of the class described with an underlying reflector member and adjustable tension means for clamping the heating unit and reflector member in an opening in a cooktop.

SUMMARY OF THE INVENTION

The present invention, in accordance with one form thereof, relates to a low thermal mass, solid plate surface heating unit having a top plate of high thermal conductive material on the order of copper, where the top plate is of light weight composite sheet material having an outer skin of high strength on the order of stainless steel that has resistance to corrosion and oxidation. A reliable and long life heating means is positioned beneath the top plate and in direct thermal relationship with the underside thereof. Reinforcing means are provided for the plate to prevent warpage due to uneven temperature distribution. An adjustable tension means is furnished beneath the unit for clamping the unit in an opening in a cooktop.

BRIEF DESCRIPTION OF THE DRAWINGS

My invention will be better understood from the following description taken in conjunction with the accompanying drawings and its scope will be pointed out in the appended claims.

FIG. 1 is a bottom plan view of a light weight solid plate surface heating unit embodying the present invention, but minus its reflector member, showing a spiral coiled metal sheathed electrical resistance eating element fastened along its length to the underside of a top plate of high thermal conductive material.

FIG. 2 is a fragmentary cross-sectional elevational view through one-half of the surface unit of FIG. 1 taken on the line 2—2 thereof, except that the unit is complete with a bottom reflector pan, and the unit is shown mounted in an opening in a cooktop by means of an adjustable tension member at the center of the unit.

FIG. 3A is a combined illustration and performance chart of a 1250 watt, solid plate surface heating unit of the present invention when boiling water in a small diameter pan.

FIG. 3B is a time-temperature graph for the solid plate heating unit of FIG. 3A showing the time it takes to boil one quart of water as 8.5 minutes.

FIG. 4 A is a combined illustration and performance chart similar to FIG. 3A of a standard or prior art 1250 watt, spiral coiled, metal sheathed resistance heating element when boiling water in a small diameter pan.

FIG. 4B is a time-temperature graph for the spiral coiled heating element of FIG. 4A showing the time it takes to boil one quart of water as 13 minutes.

FIG. 5 is a bottom plan vie of a second modification of a solid plate surface heating unit embodying the present invention showing a different shape of coiled, metal sheathed resistance heating element generally in the shape of a four-leaf clover, there being a combined reinforcing member and reflector pan adapted to underlie the heating element and to be fastened to the underside of the top plate and sealed at its periphery therewith so that the area between the plate and the reflector pan can be evacuated to form a vacuum pressure therein.

FIG. 6 is a cross-sectional elevational view of the second modification of the present invention taken on the line of 6—6 of FIG. 5.

DESCRIPTION OF THE PREFERRED EMBODIMENTS

Turning now to a consideration of the drawings and in particular to FIG. 2 there is shown a cross-sectional elevational view of one-half of a solid plate surface heating unit 10 embodying the present invention having a top plate 12 formed of thin composite sheet material of high thermal conductive material with a center core 14 of material such as copper, silver or aluminum for distributing the heat rapidly over the entire plate so as to obtain generally uniform temperature distribution. Copper has very low strength at temperatures ranging in the vicinity of 1400° F., and also it oxidizes very readily. Since this copper sheet 14 is of small thickness, on the order of 0.040 inches, it would tend to warp easily under normal use conditions due to thermal stresses caused by uneven temperature distribution, and also due to the high temperatures to which it is exposed. Even if the top plate is ideally designed and all portions of the plate would operate at the same temperature during no-load condition or when the cooking utensil used thereon has a perfectly flat bottom, such top plate would develop thermal stresses when a cooking utensil is used thereon having a warped bottom of irregular surface or one with either a convex or a concave bottom surface. If the bottom wall of the cooking utensil is warped badly there might only be a few contact points between the utensil and the top heating plate. These contact points would act as heat sink areas and would tend to create relatively cool spots on the top heating plate. The remainder of the bottom wall of the utensil would act as a reflector member redirecting the heat received from the plate back toward the plate and thereby creating hot spots.

Most of the materials used heretofore for solid plate surface heating units were stainless steel, carbon steel, cast iron aluminum and the like, where the thermal conductivity was rather low. Thus the heat flow from the hot spots to the cold spots would be slow, thereby creating a considerable temperature gradient and consequent high thermal stresses. Copper for example has a thermal conductivity of 2700 B.t.u./sq.ft.-hr.° F./in. as compared with 96 B.t.u./ft.$^2$-hr.° F./in. for 309 stainless steel. The copper core 14 is sandwiched between two thin, integral stainless steel skins 15 and 16, each of a thickness of about 0.016 inches. The stainless steel skins protect the copper against corrosion and oxidation. In order to avoid exposure of the copper on the peripheral edge of the plate, the two stainless steel skins 15 and 16 will be sealed over the edge with a pinching action. Because of the high heat diffusivity of the copper core 14 a relatively short heating element 18 may be used with only three turns or coils. Careful tests have shown that such a unit has only a 40° F. temperature gradient as compared with about 270° F. for cold rolled steel plate having a much longer heating element. The copper layer diffuses the heat across the plate surface, thus reducing the thermal stresses considerably. The stainless steel skins 15 and 16, being on the outer surface of the plate provide strength to the plate. Such a plate would have only slightly lower strength than a solid stainless steel plate of a similar thickness. The composite plate resists warpage because it combines a high strength with high heat diffusivity, which no single material plate can provide.

The thin composite sheet material 12 of central copper core 14 and two outer stainless steel skins 15 and 16 may be formed of individual sheets which are "area welded" together as by a process of explosive welding which causes a bonding of the metal sheets along their mating surfaces.

Looking at FIG. 1, which is a bottom plan view of the solid plate heating unit of FIG. 2 but with the bottom reflector pan removed, the nature of the metal sheathed electrical resistance heating element 18 is easily discernible. As is well understood by those skilled in this art, such a metal sheathed heating element 18 would include a central resistance wire 11 of helical formation that is inserted into a metal tube 13 and the tube is filled with a suitable electrical insulating material and thermal conductive material 17, such as magnesium oxide or the like. Notice in FIG. 2 that the heating element 18 is shown in a flattened condition which of course would have the effect of flattening the helical resistance wire 11. In order to increase the strength of the top plate 12, the heating element 18 is fastened along the length thereof to the underside of the top plate 12 as by brazing.

Another method of strengthening the top plate 12 is to form its peripheral edge with a downturned flange 20 which may either be slightly tapered downwardly as shown in FIG. 2 or which may be of generally vertical configuration. Again to ensure the rigidity of the top plate 12, a reinforcing member 22 is positioned beneath the plate and fastened to the underside thereof to increase its depth. This reinforcing member 22 may be of many different configurations, as there is no one way to design it. The one shown has a central member 24 in the shape of a hollow cylinder, and extending radially therefrom is shown a series of five struts 25 in the form of edgewise vertical plates which underlie the top plate 12 and extend to the peripheral flange 20 thereof. These struts 25 are each undercut slightly along the top edge so as to accommodate the turns of the flattened heating element 18 which extend therethrough. Thus the top edge of these struts is fastened, as by brazing, to the underside of the top plate 12.

FIG 2 shows an assembly view of the solid plate surface heating unit 10 where there is a supporting cooktop 27 having a circular opening 28 for the heating unit. Notice that the cooktop, in the area surrounding the peripheral edge of the opening 28, is shown slightly depressed as at 30, the purpose being to recess the top plate 12 slightly so as to facilitate the ease of sliding a cooking utensil on and off of the heating unit. Moreover, the recess would be easy to clean of food soil. The top plate 12 could be coated with a high temperature porcelain enamel that would match or compliment the porcelain enamel finish of the cooktop 27. It is also well to provide a liquid sealing means between the cooktop 27 and the top plate 12 of the surface unit 10 to prevent spillovers from passing through the cooktop opening 28 and into the area beneath the cooktop where the electrical lead wires (not shown) for the heating element 18 would be strung. Thus, I provide a small asbestos gasket 32 beneath the edge of the inclined flange 20 of the top plate 12 and it serves a dual function of a liquid sealing means as well as a thermal break to reduce the conduction of heat from the plate 12 to the cooktop 27 and to render the heating unit more effective for its intended purpose.

For improved results it is best to provide a reflector member 35 beneath the heating unit 10 so as to redirect the heat from the heating element 18 in an upward direction. This reflector 35 may also be used as a part of a holddown means for the heating unit. Notice that the reflector 35 is of a size larger than the opening 28 in the cooktop so that it underlies the peripheral edge of the opening. Rather than having the reflector 35 bear directly against the underside of the cooktop 27, a series of widely spaced clip members 37 are fastened to the underside of the edge of the opening 28 for spacing the reflector 35 away from the underside of the cooktop so as to reduce the conductive path and provide a thermal break between the heating unit and its reflector.

J-bolt adjustable tension member in the form of an inverted J-bolt 39 is adapted to be connected between the reinforcing member 22 and the reflector 35 as is best seen in FIG. 2. The central member 24 of the reinforcing member 22 is provided with a diagonal, vertical plate 40 having an aperture 41 through which the head of the J-bolt 39 is inserted. The reflector 35 has a central opening 43 for receiving the lower end of the J-bolt 39 therethrough. The lower end of the bolt has a threaded portion for receiving an adjusting nut 45 thereon.

Clearly this solid plate surface heating unit 10 can only be fastened in the opening 28 of the cooktop 27 from the underside thereof. If it is not felt important to mechanically hold down the surface heating unit 10, the reflector 35 could merely be rested on the bottom of a rough-in box (not shown) which is a standard element of a dropin cooktop for enclosing the electrical lead wires and terminals of the heating element 18 and in some cases the control switches (not shown) for governing the rate of heating of the heating element 18.

One of the primary advantages of the solid plate surface heating unit of the present invention is that its performance is superior to the present day spiral coiled heaters for the smaller diameter pans. The heat readily flows laterally through the top plate from the outer area not covered by the pan to the central area covered by the pan bottom. This is as illustrated in FIG. 3A taken in comparison with a standard spiral coiled heating element 65 of FIG. 4A. With the solid plate unit 10 of FIG. 3A, the outer uncovered area runs relatively cool at about 14.8 W/in$^2$, while the central area covered by the pan 67 has a much higher watts density of about 75.6 W/in$^2$. This explains the relatively small temperature gradient between about 600° F. of the central area and about 750° F. of the outer uncovered area which of course results in low thermal stresses. It also explains the high speed of the solid plate heating unit 10 of boiling a quart of water in the pan 67 in about 8.5 minutes as seen in FIG. 3B. There is a low current leakage capability of this solid plate surface heating unit 10 because of the relatively low operating temperature. Moreover the sheath temperatures are only slightly higher than the temperature of the top plate. One alternative would be to reduce the spacing between the two outermost coils over the spacing at the center of the unit 10 so as to compensate for the heat losses at the periphery of the unit and thereof obtain uniform temperature distribution.

Turning to a consideration of standard spiral coiled heating element 65 of FIG. 4A which is of the same wattage as the heating element 18 of FIG. 3A With the standard spiral coiled heating element 65 the outer uncovered area runs relatively hot at about 39 W/in$_2$, while the central area covered by the pan 67 is of equal watts density 39 W/in². This results in a rather large temperature gradient between the central covered area of 800° F. and the outer uncovered area of 1450° F., which is the temperature condition at the time of reading boiling temperature of a quart of water after 13 minutes of heating.

In summary, it is clear that the use of the light weight composite sheet material for the top plate 12 of the heating unit 10 renders the heat energy of the unit automatically adjustable with a fast response to the size of the cooking utensil.

A relative performance chart of two 1250 W. surface units of the standard coiled design and the solid plate design of the present invention is given below:

| Pan | Spiral coiled | | Solid plate | |
|---|---|---|---|---|
| | Time to boil, min. | Time to stop, min. | Time to boil, min. | Time to stop, min. |
| Flat bottom, 24.8 oz. | 6.95 | 0.78 | 6.82 | 0.87 |
| Convex bottom, 13.7 oz.-3/32" | 8.12 | 1.20 | 7.63 | 1.30 |
| Concave bottom, 5.7 oz. 1/8" | 8.40 | 1.00 | 7.75 | 1.32 |

The weight of the heating element 18 of the present invention is about one-half of the weight of a standard heating element 65 of exactly the same wattage. This is possible because of the use of the top plate 12 of high thermal conductivity for fast head distribution and less heat loss as is clear from a comparison of FIGS. 3A and 4A The thermal mass of a heating unit is a direction function of the weight and the specific heat of the unit. Since the solid plate unit 10 operates at lower temperatures for the same amount of heating, less heat is stored in the unit resulting in fast response to both heat-up and cool-down. This is calculated by the formula:

$Q = W \times Cp \times \Delta t$ where $Q$ = Stored Heat
$W$ = weight in lbs.
$Cp$ = specific heat in B.t.u./°F.lb.
$\Delta t$ = temperature change from room ambient to operating temperature A second modification of the present invention is shown in cross-sectional elevational view in FIG. 6, wherein the same elements used in the first modification will be given the same reference numerals. This second modification is identified as solid plate surface heating unit 50 having a top plate 12 of composite sheet material with the center core 14 of high thermal conductivity and the top and bottom outer skins 15 and 16 respectively of stainless steel or the like, where the peripheral edges of the skins 15 and 16 are sealed over the peripheral edge of the center core 14.

A different type of coiled metal sheathed resistance heating element is used; namely, one having a generally clover leaf configuration 52, as is best seen in FIG. 5, for covering as much as possible of the surface area of the top plate 12 on the underside thereof. Another departure from the first modification is to provide an integral reflector pan 54 which is provided with generally radially ribs 55 and 56 which are located between the coils of the heating element 52 and are formed upwardly so as to engage the underside of the solid plate 12 as is best seen in FIG. 4. The reflector pan 52 is dished out in the vicinity of the coils of the heating element 52 as is seen at 58 and 59 in FIG. 6. Thus it will be seen that I have combined two functions that are present in the first modification of FIG. 2; namely, that of the reinforcing member 22 and the reflector member 35. In the second modification the reflector 54 satisfies both functions.

The metal sheathed resistance heating element 52 is also a flattened member that is fastened as by brazing along its length to the underside of the solid plate 12. The bottom surface of this plate and heating element assembly may have a low emissivity metallic finish. The reflector 54 is made of a low thermal conductivity, thin stock material such as stainless steel or the like. The upper surface of this reflector 54 will have low emissivity. In order to prevent the oxidation of the reflective finish, the reflector 54 is hermetically sealed at its periphery to the underside of the plate 12 and the space between the solid plate 12 and the reflector 54 is evacuated. Accordingly, the reflector surfaces will stay reflective during the life of the unit.

Modifications of this invention will occur to those skilled in this art. Therefore it is to be understood that this invention is not limited to the particular embodiments disclosed but that it intended to cover all modifications which are in the true spirit and scope of this invention as claimed.

I claim:

1. A low thermal mass, plate surface heating unit comprising a light weight top plate of high termal conductivity material, a metal sheathed electrical resistance heating element held in contact with a wide area of the underside of the plate to obtain generally uniform heating whereby the top plate acts as a heat sink for the heating element, the top plate being formed of composite sheet material with a center core of high thermal conductivity selected from the group comprising copper, silver and aluminum, and an outer skin sealing the core and selected from the group of materials comprising stainless steel, nickel and chromium, said outer skin serving to reinforce the center core and prevent its oxidation and corrosion, and a light weight reinforcing member of large depth braced against the underside of the plate across the span thereof to prevent warpage of the plate due to uneven temperature distribution.

2. A low thermal mass, plate surface heating unit as recited in claim 1 wherein the said light weight reinforcing member is of open framework design having a series of vertically disposed radial struts extending outwardly from a center member, the top edges of the radial struts being attached to the underside of the top plate.

3. A low thermal mass, plate surface heating unit as recited in claim 1 wherein the heating element is of coiled configuration, and the light weight reinforcing member is a reflector pan-shaped member which underlies the coiled heating element and has embossed ribs interposed between the coils of the heating element, and these ribs are attached to the underside of the top plate. oxidation 4. A low thermal mass, plate surface heating unit as recited in claim 3 wherein the underside of the top plate and the heating element has a low emissivity coating, while the reflector pan is formed of thin metal stock of low conductivity, the periphery of the pan being hermetically sealed to the underside of the top plate, while the interior of the reflector pan also has a low emissivity reflective coating, and the pan interior is evacuated in order to prevent the oxidation of the reflective surface.

5. A low thermal mass, plate surface heating unit comprising a light weight top plate of composite sheet material with a center core of high thermal conductivity selected from the group of high thermal conductivity metals and alloys such as copper, silver and aluminum and an outer skin surrounding the center core and selected from the group of oxidation and corrosion resisting metals and alloys such as stainless steel, nickel and chromium, a metal sheathed electrical resistance heating element of coiled configuration fastened to a wide area of the underside of the plate to obtain generally uniform heating whereby the top plate acts as a heat sink for the heating element, and a light weight reinforcing member of open framework and large depth attached to the underside of the plate to prevent warpage of the plate, said framework having a central member and a series of radial struts extending outwardly therefrom.

6. A low thermal mass, plate surface heating unit comprising a light weight plate of composite sheet material with a center core selected from the group of high thermal conductivity metals or alloys such as copper, silver and aluminum, and an outer skin selected from the group of strong and oxidation and corrosion resisting metals or alloys such as stainless steel, nickel and chromium, a metal sheathed electrical resistance heating element of coiled configuration fastened to the underside of the plate over a wide area to obtain generally uniform, heating whereby the top plate acts as a heat sink for the heating element, and a light weight reinforcing member in the form of a reflector pan which underlies the heating element and is also attached to the underside of the plate to prevent warpage of the plate, the underside of the top plate and the heating element having a low emissivity coating, while at least the interior of the reflector pan has a reflective coating.

7. A low thermal mass, plate surface heating unit comprising a thin plate formed as an inverted pan with downturned peripheral flange, the plate being of composite sheet material having a center core selected from the group of high thermal conductivity metals and alloys such as copper, silver and aluminum and an outer skin sealed over the core and selected from the group of oxidation and corrosion resisting metals and alloys such as stainless steel, nickel and chromium, a metal sheathed resistance heating element of coiled configuration attached to the underside of the top plate over a wide area to obtain generally uniform, heating whereby the top plate acts as a heat sink for the heating element, and a light weight reinforcing member of large depth attached to the underside of the top plate to prevent warpage of the plate due to uneven temperature distribution.

8. A low thermal mass, plate surface heating unit as recited in claim 7 wherein the coiled heating element is of generally multiple-leaf clover configuration so as to cover a substantial area of the thin plate, the said reinforcing member being in the form of a reflector pan which covers the heating element and has radial embossed ribs interposed between the coiled heating element and these ribs are attached to the underside of the thin plate.

9. A solid plate surface heating unit comprising a light weight top plate of composite sheet material with an inner core of high thermal conductivity selected from the group comprising copper, silver and aluminum, the core being sealed in an outer skin selected from the group comprising stainless steel, nickel and chromium, the said top plate being substantially flat with a downturned peripheral flange to reinforce the plate, a spiral coiled metal sheathed resistance heating element fastened along the length thereof to the underside of the top plate over a wide area to obtain generally uniform, heating whereby the top plate acts as a heat sink for the heating element, additional reinforcing means of light weight open framework and large depth also fastened to the underside of the top plate to insure that the plate will remain in a flat condition when it is operating at high temperatures in the range up to about 1400° F.

10. A solid plate surface heating unit comprising a light weight top plate of composite sheet material with an inner sheet of high thermal conductivity on the order of copper and a top and a bottom sheet of lower conductivity but of higher strength and resistance to oxidation than the inner sheet on the order of stainless steel, the peripheral edges of the top and bottom sheets being sealed together over the edge of the inner sheet to protect the inner sheet against corrosion and oxidation, a spiral coiled metal sheathed resistance heating element fastened to the underside of the top plate over a wide area to obtain generally uniform, heating whereby the top plate acts as a heat sink for the heating element, and a light weight reinforcing means of large depth also fastened to the underside of the top plate to insure that the plate will remain in a flat condition when it is operating at temperatures reaching as high as 1400° F.

11. A solid plate surface heating unit as recited in claim 10 wherein the said reinforcing member is of open framework construction having a central member with a series of outwardly directed vertically disposed arms that are attached at their upper edge to the underside of the top plate, and a thermal reflecting member positioned beneath the unit for redirecting the heat in an upward direction.

12. A solid plate surface heating unit as recited in claim 11 wherein the said thermal reflecting member is also a holddown member which is adapted to underlie the edge of an opening in a cooktop in which the unit is to be mounted, and an adjustable tension member joining the reinforcing member to the reflecting member for clamping the member in a stationary operating position.

13. A cooking appliance comprising a cooktop having at least one opening formed therein, a solid plate surface heating unit mounted in the said opening, the unit having a light weight solid plate of composite sheet material of relatively high thermal conductivity positioned over the opening, the peripheral edge of the plate being formed downwardly into a reinforcing flange, a spiral coiled metal sheathed resistance heating element fastened along the length thereof to the underside of the top plate over a wide area to obtain generally uniform, heating whereby the top plate acts as a heat sink for the heating element, a light weight reinforcing member of large depth also fastened to the underside of the top plate to prevent warpage of the plate and projecting down through the cooktop opening, a thermal reflecting member underlying the unit for redirecting the heat in an outward direction, said reflecting member underlying the edge of the opening in the cooktop in which the unit is mounted, and an adjustable tension member joining the said reinforcing member and the said reflecting member so that the edge of the opening is clamped by the interaction of the top plate and the reflecting member.

14. A surface heating unit for a cooking utensil defining a container for the preparation of food, wherein the unit is a low thermal mass, solid plate surface heating unit that has a light weight top plate of composite thin sheet metal material with a high thermal conductivity and an exterior surface that is resistant to oxidation and corrosion, and a spiral coiled metal sheathed resistance heating means of about half standard weight for a given wattage fastened to the underside of the top plate along the length thereof over a wide area to obtain generally uniform, heating whereby the top plate acts as a heat sink for the heating element, a light weight reinforcing means of large depth fastened to the underside of the top plate to resist warpage of the plate during operation at high temperatures due to thermal stresses, the heat flow of the top plate of the unit being automatically adjustable to the size of the bottom face of the utensil to deliver substantially more heat to the area of the plate in contact with the bottom of the utensil than to the outermost exposed area of the plate, the outer coils of the heating element being closer spaced than the center coils so as to compensate for the heat losses at the periphery of the plate and obtain generally uniform temperature distribution across the plate when it is substantially completely covered by a cooking utensil, the conductivity of the top plate being of such a high value that it operates at a temperature only slightly higher than the temperature of the sheath of the heating element which permits the use of a lower temperature heating element of about half the weight over standard open coiled units of substantially equal wattage, while the relatively low operating temperatures of the sheath of the heating element also results in greatly reducing the current leakage through the heating element to the top plate and thence to the supporting structure for the heating unit.